UNITED STATES PATENT OFFICE.

MAX SUESS, OF CHICAGO, ILLINOIS.

PROCESS OF DECORATING GLASS BY SAND-BLAST.

SPECIFICATION forming part of Letters Patent No. 504,543, dated September 5, 1893.

Application filed May 26, 1892. Serial No. 434,420. (No specimens.)

*To all whom it may concern:*

Be it known that I, MAX SUESS, a citizen of the United States, residing at Chicago, in the county of Cook and State of Illinois, have invented a certain new and useful Improvement in the Process of Decorating Glass by Sand-Blast, which is fully set forth in the following specification.

The object of my invention is to cheapen and expedite the ornamentation of glass which is largely used in the interior of buildings. The surface of such glass has heretofore been enameled in full or in part, and had figures and designs drawn upon its surface, but I have invented a new process of ornamenting plain glass by producing upon its surface designs and figures by means of having the glass more opaque in some parts than in others, or colored in some parts and not colored in others. The coloring may be of any color desired.

My invention consists in first preparing the glass when I use colors to make colored figures or designs, by covering the entire surface with a thin coating of lacquer of the desired color, or I prepare it by passing the glass under a sand blast to grind it slightly, making it slightly opaque; I then place upon the surface of the glass a stencil cut according to the figures and designs which I desire to make upon the surface of the glass. The material I use for a stencil must be a metal or other sheet plate sufficiently thick to keep its form and shape, and be susceptible of being readily removed and washed to prepare it for repeated use a large number of times. I cut the stencil so as to leave the parts of the glass exposed through the stencil which I do not wish to change from the first preparation of the glass. I put upon the parts of the glass which are exposed through the stencil a putty, which I make from china clay, dextrine, glue, whiting, or other similar material mixed with water, which forms a coating upon that part of the surface of the glass which is exposed through the stencil. I then remove the stencil from the glass while said coating is soft, and after allowing the putty to dry, I submit the glass to a sand blast which removes the lacquer and grinds the glass or further grinds it wherever the putty does not cover it. I then remove the putty by dissolving it in water, or other fluid, the parts of the glass which were covered by the putty remaining of the color and in the condition in which it was originally prepared; or if I use clear glass, without any first preparation, these parts which were covered by the putty through the stencil are clear after the stencil is removed.

I find that in using the stencil for covering parts of the glass, it cannot always be used to cover the part which I wish to be protected and kept in the condition that it was in when the stencil was placed on the glass. In such instances I use the putty to cover those surfaces when the glass is being further treated to the sand blast after the stencil is removed. By this process I am able to ornament glass cheaply and rapidly in imitation of enamel with designs and figures, either in colors or in varying degrees of opaqueness, or with parts clear and other parts opaque. I have quite extensively used my process for ornamenting glass, and find it very durable. I have made it extensively with the figures left clear, and either ground or colored between the figures, and also with the figures colored or ground only slightly, and left clear between the figures or designs.

I am aware that tin foil has been used in decorating glass by spreading it upon the surface of the glass and making a pattern through the tin foil and covering the tin foil and openings through it, with glue, then removing the tin foil. This I do not claim. In using the tin foil it is necessary to wet it with gum-arabic or some other adhesive mixture to hold it in position on the glass. My stencil is simply laid upon the glass, and has sufficient rigidity to keep its form and place on the glass by simply pressing it.

Having fully described my invention, what I claim, and desire to secure by Letters Patent, is—

The process of decorating glass, or like material, which consists in first coating the surface to be decorated with a coating of colored lacquer, or otherwise preparing as desired for a ground work, then placing upon said surface a stencil plate, then spreading upon the exposed parts through the stencil a coating of suitably prepared putty, then removing the stencil, then drying the putty, then exposing the surface thus prepared to the action of a sand blast, and then removing the putty, substantially as set forth.

MAX SUESS.

Witnesses:
ALOYSIA HELMICH,
H. D. HOLLISTER.